F. Nishwitz,
Harvester Rake.
No. 9975.                        Patented Aug. 30, 1853.
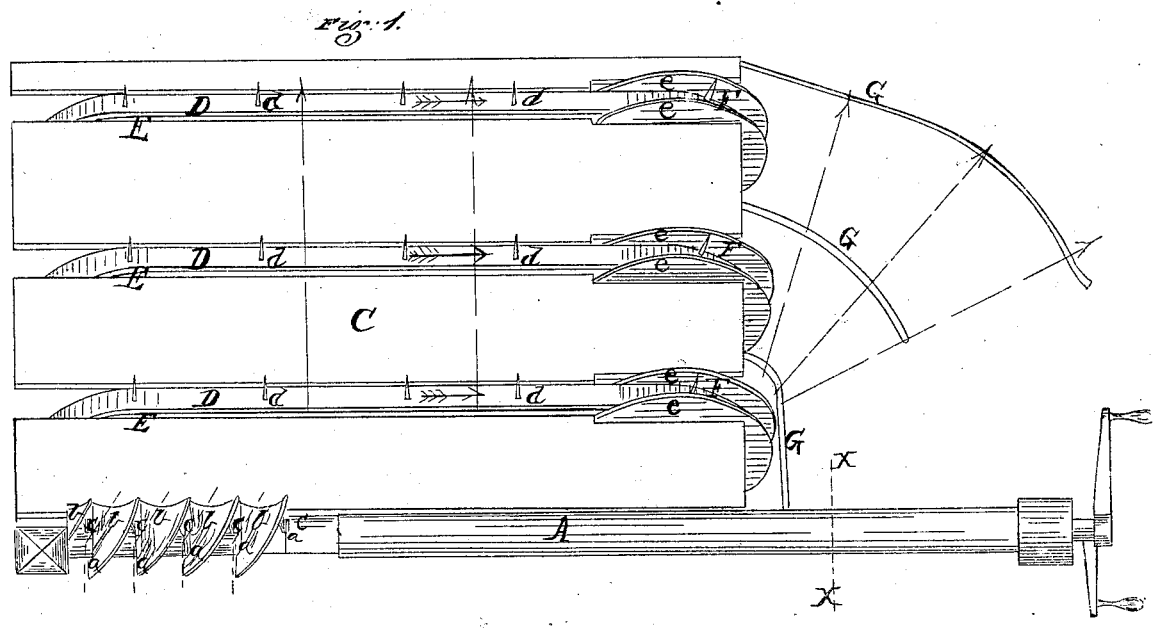
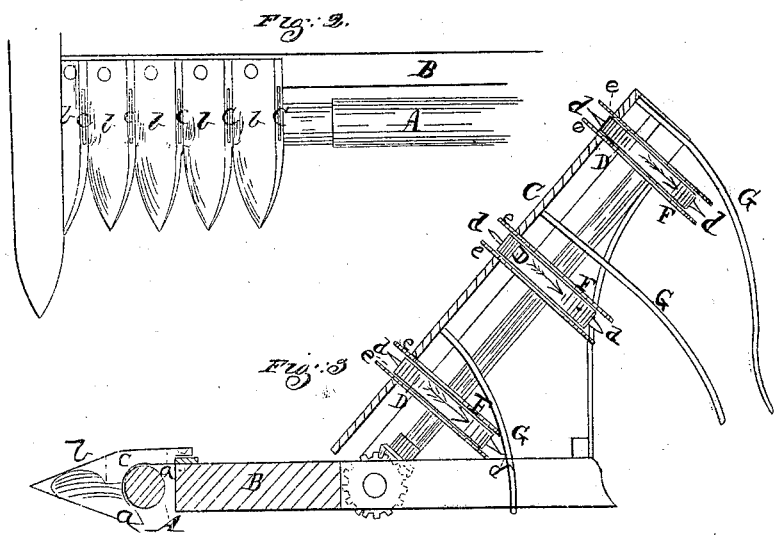

UNITED STATES PATENT OFFICE.

FREDERICK NISHWITZ, OF WILLIAMSBURG, NEW YORK.

IMPROVEMENT IN GRAIN-HARVESTERS.

Specification forming part of Letters Patent No. 9,975, dated August 30, 1853.

*To all whom it may concern:*

Be it known that I, FREDERICK NISHWITZ, of Williamsburg, in the county of Kings and State of New York, have invented certain new and useful Improvements in Reapers or Harvesting-Machines; and I do hereby declare that the following is a full, clear, and exact description of the construction and operation of the same, reference being had to the annexed drawings, making a part of this specification, in which—

Figure 1 is a front view of the machine in elevation. Fig. 2 is a plan or top view of a portion of the fingers and cutter-shaft. Fig. 3 is a side view of the machine, one side of the cutter-shaft, and front board of the machine X X, Fig. 1, being the line of section.

Similar letters of reference indicate corresponding parts in each of the several figures.

This invention relates to certain improvements in reaping or harvesting machines; and it consists, first, in a peculiar construction and arrangement of cutters and fingers, which will be hereinafter described; second, in the employment or use of flanged rollers, arranged, as will be hereinafter shown, for the purpose of throwing or detaching the grass or grain from the discharging ends of the belts.

To enable others skilled in the art to make and use my invention, I will proceed to describe its construction and operation.

A represents a cylindrical shaft, on which is placed a series of cutters, $a$. (See Figs. 1 and 3.) This shaft is placed at the front part of the machine or frame of the machine. (See Fig. 3.) Directly behind the shaft A is the front board or brace, B, of the frame. To the upper surface of this front board there is attached a series of fingers, $b$, which partially encircle the shaft. These fingers have an oblique position, as will be seen in Fig. 1. They terminate in a point, as seen in Figs. 2 and 3. The obliquity of the fingers will be better understood by describing the upper edge of each blade of the fingers as projecting a little over the lower edge of the blade of the finger adjoining it on the right side, supposing the eye to be directed at Fig. 1. Through each finger there is a slot, $c$. (See Figs. 1 and 2 and dotted lines in Fig. 3.) These slots are for the purpose of allowing the cutters $a$ to pass through as the shaft A rotates. The slots pass vertically entirely through the fingers.

The cutters $a$ project at right angles from the shaft, and there are two that pass through each slot, or two to each finger, placed at opposite points upon the periphery of the shaft, as seen in Fig. 3. The cutters are not placed in line the whole length of the shaft, but are on the shaft spirally, as seen in Fig. 1.

The operation of the cutters and fingers will be readily understood. Motion is communicated to the shaft A in any proper manner, and the cutters $a$, as the shaft A rotates, pass through the slots $c$ in the fingers $b$. As the machine is moved along, the grass, grain, or whatever article is being cut passes between the fingers $b$, and the fingers having an oblique position, as before described—viz., the upper edge of each finger projecting a little over the lower edge of the finger adjoining it on the right side—the grass or grain will be bent as indicated by the red lines in Fig. 1, and consequently the cutters $a$, as they rotate, cut off the grass or grain with an oblique cut. The bending of the grass or grain causes it to be drawn tight, and the cutters consequently act upon it and cut it with the greatest ease and certainty.

By this improvement all shaking or jarring of the machine is avoided. There is no great friction, as is the case where the reciprocating saw-toothed cutters are used, nor is there any possibility of the cutters being clogged or choked, as is often the case in other reaping-machines.

C is an inclined bed placed directly back of the front board or brace, B. (See Figs. 1 and 3.) On this bed C there is an endless apron composed of a number of belts, D, passing over pulleys E E E and F F F. Three belts are represented in the drawings; but any proper number may be employed. The belts are provided with spikes $d$, and the grass or grain, as it is cut by the cutters, falls upon these belts, the spikes $d$ retaining the grass or grain upon the belts. The belts move in the direction indicated by the arrows. The pulleys F F F are provided with flanges $e$—one on each side; or the pulleys F F F may be described as being deeply grooved, the belts fitting in the grooves. At the end of the bed C where the pulleys F F F are placed are curved guides G G G, which are so curved or bent as to cause the grass or grain to be turned as it descends upon them, the butt of the stalks or straw being toward the bed.

The operation of this improvement is extremely simple. The grass or grain, as before stated, after being cut, falls against the belts D, the spikes $d$ retaining the grass or grain upon the belts, and the belts moving in the direction of the arrows. As the belts pass around the pulleys F F F the flanges $e$ throw the grass or grain free from the spikes, and it falls upon the curved guides G G G, and from thence to the ground, the guides, owing to their curvature, causing the butt of the straw or grass to be toward the machine. (See red arrows in Fig. 1, which represent the grain.)

The object of the spikes is to properly retain or hold the grass or straw upon the belts while passing over the bed, and the object of the flanges is to throw off the grass or straw from the spikes and belts upon the guides when the grass or grain reaches the end of the bed to which the guides are attached.

The pulleys are hung upon shafts, and may have motion communicated to them in any proper manner.

Having thus described the nature and operation of my invention, what I claim as new, and desire to secure by Letters Patent, is—

1. The combination of the fingers $b$ and cutters $a$, or their equivalents, constructed, arranged, and operating in the manner and for the purpose substantially as herein shown and described.

2. The employment or use of the flanged pulleys F F F, arranged as shown, for the purpose of throwing or detaching the grass or grain from the belts D D D.

FREDERICK NISHWITZ.

Witnesses:
S. F. COHEN,
S. H. WALES.